Patented Sept. 29, 1953

2,653,875

UNITED STATES PATENT OFFICE 2,653,875

METHOD OF PREPARING PEANUTS AND THE PRODUCT RESULTING THEREFROM

Josephine N. Wergeland, Chevy Chase, Md.

No Drawing. Application June 11, 1953,
Serial No. 361,090

8 Claims. (Cl. 99—126)

The invention relates to the product of and the method of preparing whole shelled nuts—particularly peanuts—as an edible product having new characteristics in both taste and appearance and is a continuation-in-part of the invention disclosed in my co-pending application, Serial No. 272,501, filed February 19, 1952, now abandoned.

Heretofore, kernels or meat portions of certain nuts, especially peanuts, have been treated in various manners for human consumption with a view of improving their taste qualities and, in some instances, their appearance and keeping qualities over that found in their natural or raw state. This has been done by roasting, salting, cooking in oil, boiling in water, mixing them with warm oils or butter or a combination of these steps; and to a more or less degree nuts so treated have found favor among the consuming public. Peanuts in their raw state are regarded by the majority of persons as not edible or appetizing; and the prevailing practice is, however, to roast them either within their shell or when unshelled or skinned and, often, are salted; and, when so roasted, are very hygroscopic and become soft unless hermetically sealed or kept in an atmosphere made dry by heat.

I have found that unshelled-peanuts can be made into a very appetizing and tasteful product differing considerably in taste from either the raw peanut or the roasted peanut and having a taste approaching almonds yet retaining sufficient of the peanut flavor as to have a new or different appetizing flavor to the taste and to be a desirable food product considerably less hygroscopic and having longer or greater keeping properties against becoming soft or soggy (commonly referred to as being stale) than roasted peanuts; and the object of my invention is to attain such a product.

To attain the product just mentioned, I, first, remove the shells from a quantity of raw matured peanuts and, second, place them in a receptacle containing hot water, and allow the nut kernels to remain therein long enough to absorb the water for about 1½ hours, with occasional stirring or gentle agitation, while the water cools from its initial temperature. When the water is cool enough to allow insertion of the human hands, the skins are removed from the peanuts, while in the water. This removal of the skins may be done by rubbing the skin with the fingers of the hands or by a tumbling and flushing action or in any manner known for this purpose. Should the skins not loosen from some of the peanuts as the result of the first application of the boiling water, some of the cooled water may be removed and more hot water added to the receptacle, in which the peanuts remain until the water has again cooled, at which time the skins are removed from the peanuts as just mentioned.

The soaking step in hot water is important to the results obtained and does two things: (1) the peanuts are blanched and absorb some of the water and swell or expand in size and (2) results in the skins bursting and loosening from the kernels, which skins then can be readily removed by rubbing with the fingers or by a mechanical means now employed for this purpose on a production basis. The removal of the skins should be gentle, whether manually performed or mechanically performed, so that the two halves of the peanuts will not become detached in order to preserve, as far as possible, the natural whole appearance of the nut kernel.

In this soaking step, it is also important that the hot water be of the required temperature and that soaking be of sufficient duration. I have found the initial temperature of the water or soaking bath may vary from the boiling point of the water to about 155° F. and that the soaking period may vary from about 1½ hours or more to about 15 minutes more or less, in hot water at various initial temperatures within the range just stated, but with varying results in the end product. The initial temperature of the soaking bath seems to play an important part in obtaining the desired results in the end product; and, apparently, these initial temperatures should not be sustained for much longer than it takes the bath to cool therefrom to a lower temperature, as when permitted to cool gradually at ordinary room temperatures, so as not to cook the nut kernel at a sustained heat. The varying results, just stated, may be generally designated, in the order given, as follows: Superior, Excellent, Good, Fair, Passable, Edible and Poor.

Superior results are obtained by a soaking of the kernels in water having an initial temperature approaching its boiling point, say from about 195° F. to 212° F. for a period of about 1½ hours or more, but the following table will indicate the variations to which reference is made above.

The nut kernels have been permitted to remain in the soaking bath to as much as 2 to 2½ hours but the final product was no better than when the kernels remained in the bath for only about 90 minutes. Therefore, since speed of production is an item of consideration, the lowest possible period of soaking, which will produce acceptable results, should be practiced. It appears that, when the initial temperature of the water is below about 155° F., the results are unsatisfactory irrespective of the soaking period and that when less than 15 minutes' soakage is employed the end product is not different from ordinary fried peanuts (i. e., merely fried in oil) and do not have the characteristics of my improved product. Also, the period of soaking may be extended for a period longer than about 90 minutes without any noticeable change in the end product.

| | Approximate Time of Soaking (Plus or Minus) | | | | | Results |
|---|---|---|---|---|---|---|
| | 90 Mins. | 60 Mins. | 45 Mins. | 30 Mins. | 15 Mins. | |
| Approximate Initial Water Temperature ranges in degrees Fahrenheit (Plus or Minus) | 200°–212° | | | | | Superior. |
| | 180°–200° | | | | | Excellent. |
| | 160°–180° | | | | | Good. |
| | 155°–160° | | | | | Passable. |
| | 150°–155° | | | | | Edible. |
| | | 185°–212° | | | | Good. |
| | | 160°–185° | | | | Fair. |
| | | 155°–160° | | | | Passable. |
| | | 150°–155° | | | | Edible. |
| | | | 160°–212° | | | Fair. |
| | | | 150°–160° | | | Edible. |
| | | | | 170°–212° | | Passable. |
| | | | | 150°–170° | | Edible. |
| | | | | | 180°–212° | Edible to Poor. |
| | | | | | 150°–160° | Poor. |

Thirdly, the denuded nut kernels, so blanched and containing the absorbed water, are then subjected to a drying step to dry their outer surface thoroughly; and this may be accomplished by spreading them upon a flat surface in a dry atmosphere at ordinary room temperature or this drying may be assisted by currents of air, preferably warm air, circulated over the surface of the nuts. This drying should be of a character that will dry only the outer surface of the kernel and not remove substantially the absorbed water interior of the kernel.

Fourthly, the peanut kernels are, then, submerged in a hot cooking oil, which latter should be at and maintained at about 300° F., plus or minus about fifteen degrees, and the kernel should remain therein for a period of about fifteen to twenty minutes with an optimum of approximately seventeen to eighteen minutes, depending somewhat upon the dryness of the surface of the kernels, as performed in the third step above. Should the temperature of the oil be substantially less than that indicated, the desired end results are not obtained even should the kernels remain therein for a longer period of time; and should the temperature be materially greater, the nut kernel will burn, frustrating the end result, and even should the kernels remain in the higher temperature a shorter time period the desired end result is not obtained. Also the oil may be used repeatedly until consumed or may have more oil added thereto. The hot oil may be any of the bland edible oils now available and of the type that does not impart its flavor to the article being cooked. I have had excellent results with the, so-called, cooking vegetable oils of the cotton-seed derivative type or of the peanut oil type. This cooking step may be carried out by placing the peanuts in a foraminated basket which is removably insertable into a receptacle containing the hot oil; or it may be done by placing the peanut kernels at one point into a moving stream of hot oil in which the nuts remain and flow therewith for the required period of time and then mechanically separated or removed from the flowing oil at another point in the flow; or the peanut kernels may be moved along in a continuous path in a container of hot oil.

Fifthly, the peanut kernels, removed from the hot oil, are then subjected to a draining and cooling step in a manner to permit any oil remaining on the surface of the peanuts to drain therefrom and to cool to atmospherical temperature. As one example, the peanut kernels may be spread in a thin layer upon an absorbent surface exposed to normal room temperature until the temperature of the kernels has equalized therewith or the cooling may be assisted by subjecting the kernels to a cooling current of air; but any other mechanical means may be employed that accomplishes this step. The peanut kernels may or may not be salted as may be desired.

The final step is to package the peanuts, thus treated, and such packaging may be in air-tight containers.

All of the steps, above defined, can be manually performed or may be mechanically performed in a continuous series of steps through the aid of mechanical equipment.

To note a variation in the method or process above defined, it is within the purview of this invention to use peanuts that have been previously unshelled, skinned and/or water-blanched by a process now well known and, if such peanuts are used, the first step, above mentioned, will be eliminated and there will be no skins to be removed in the second or soaking step; however, such previously prepared kernels must be soaked in hot water, as described above, before being subjected to the cooking step.

The immersion of the peanut kernels into hot water, and allowing the kernels to remain in said hot water while it cools from its initial temperature to a much lower temperature, which in present practice is for a period approximating 1½ hours for the best results, then allowing the surface of the peanuts to dry, without substantially drying the interior absorbed moisture within the kernel, prior to its immersion into the hot oil which is at a temperature approximating 300° F., and allowing the kernels to remain in said hot oil for a period varying between fifteen and twenty minutes, according to the conditions noted above, appears to be responsible for the characteristics of the resultant product which clearly distinguishes it from other treated peanut kernels. The soaking step in said hot water, which water is permitted to cool from its initial high temperature, is the reverse of cooking or boiling peanuts in water; and the presence of the absorbed water in the kernel seems to prevent the cooking oil from penetrating the nut and, in some manner, causing a change in cell structures of the kernel, when the cooking process has been finished and the kernels allowed to cool, to a condition whereby crispness and prevention of early rancidity is obtained as well as to give a taste somewhat resembling that of almonds.

The product resulting from the above method of treatment does not resemble roasted peanuts in color or taste and the nut kernels are much larger than the kernels of roasted peanuts, for any given grade of peanut; the peanut has not been dehydrated but has been permitted to absorb water which is retained by the nut kernel and held therein, after cooking in the hot oil which hot oil apparently seals the outer surfaces of the kernel, yet the kernels are crisp and brittle throughout their entire area after this cooking, despite the absorbed water retained by the kernel, and are quite dry in appearance and to the touch, no attempt being made to explain this apparent phenomenon; the hot oil does not cause the peanut kernels to become brown in color as they are of a color between a cream and a fawn color, and quite pleasingly appetizing to the eye; the peanut has an unusual flavor and has become a desirable marketable product of the premium variety; and the peanut does not readily absorb atmospheric moisture as do roasted peanuts, and thus remain in a firm and crisp edible condition for a longer period of time.

Having thus described my invention and the manner in which the same is to be performed, it is to be understood that the invention is susceptible to such changes and variations as may be made and fall within the scope of the appended claims.

What I claim as new and desire to secure by Letters Patent, is:

1. A method of preparing denuded peanut kernels for human consumption as a whole nut food having the characteristics described, said method comprising subjecting the denuded kernels to a soaking bath of water initially at substantially boiling temperature and for at least a duration until said water cools from its initial temperature to a much lower temperature while absorbing said water, and then cooking said kernels in a hot edible cooking oil at a temperature substantially between 285° F. and 315° F. for a period of time between about fifteen and twenty minutes.

2. A method of preparing peanut kernels for human consumption as a whole nut food having the characteristics described, said method comprising subjecting the kernels to a soaking bath of water initially at substantially boiling temperature and for approximately one and a half hours while said water cools from its initial temperature, then subjecting said kernel to a drying step to dry the surface water moisture without substantially drying the interior of said kernels, cooking said soaked and dried kernels for a period of between fifteen and twenty minutes in a bland edible vegetable cooking oil, said oil being maintained at a temperature substantially between 285° F. and 315° F., and then permitting said cooked kernels to drain and cool to the surrounding atmosphere temperature before packaging or storing.

3. In a method of preparing denuded peanut kernels for human consumption as a whole nut food, wherein the said kernels are subjected to a soaking step in hot water initially at approximately boiling temperature while said water cools from its initial temperature so the nuts absorb said water and swell, subjecting said kernels to a cooking step in a bland edible vegetable cooking oil at a sustained temperature ranging between about 285° F. and 315° F. with an optimum of approximately 300° F. for a period between fifteen and twenty minutes, and then removing said kernels from said oil and allowing the oil and the surface of said kernel to drain and the kernel to cool to ambient room temperature.

4. A method of preparing peanut kernels for human consumption as a whole nut food having the characteristics described, said method comprising subjecting the kernels to a soaking bath of water initially at substantially boiling temperature and for approximately one and a half hours while said water cools from its initial temperature, then subjecting said kernel to a drying step to dry the surface water moisture without substantially drying the interior of said kernels, cooking said soaked and dried kernels for a period of between fifteen and twenty minutes in a bland edible vegetable cooking oil, said oil being maintained at a temperature approximately 300° F. and then removing said cooked kernels from said oil and spreading them to drain and cool to ambient temperature.

5. In a method of preparing denuded peanut kernels for human consumption as a whole nut food, wherein the said kernels are subjected to a soaking bath of hot water while said bath cools from an initial temperature of about 155° F. to 212° F. for a period varying between about 15 minutes to about 150 minutes so the nuts absorb said water and swell, and subjecting said kernels while containing their absorbed moisture to a cooking step in a hot edible oil at a temperature ranging between 285° F. and 315° F. for a period about fifteen to twenty minutes.

6. The method set forth in claim 5, wherein the surfaces of said soaked kernels are dried of exterior moisture before being subjected to the cooking step.

7. As an edible product, denuded peanut kernels having a new taste flavor and greater crispness and brittleness throughout the area of said kernels and having greater keeping qualities resulting from soaking said kernels in hot water initially at approximately boiling temperature while said water cools from its initial temperature to absorb water and, then, submerging said soaked kernels in hot edible cooking oil having a temperature substantially between 285° F. and 315° F. for a period of about fifteen to twenty minutes.

8. As an edible product, denuded peanut kernels having a new taste flavor and greater crispness and brittleness throughout the area of said kernels and having greater keeping qualities resulting from soaking said kernels in hot water at an initial temperature from about 155° F. to 212° F. while said water cools from its initial temperature and, then, cooking the kernels in hot edible oil having a temperature substantially between 285° F. and 315° F. for a period substantially about fifteen to twenty minutes.

JOSEPHINE N. WERGELAND.

References Cited in the file of this patent

UNITED STATES PATENTS

| Number | Name | Date |
|---|---|---|
| 567,901 | Kellogg | Sept. 15, 1896 |
| 1,063,208 | Norton | June 3, 1913 |
| 1,908,059 | Sawin | May 9, 1933 |
| 2,106,314 | Anderson | Jan. 25, 1938 |
| 2,510,534 | Whitehead | June 6, 1950 |